United States Patent
Bai et al.

(10) Patent No.: US 7,240,135 B2
(45) Date of Patent: Jul. 3, 2007

(54) METHOD OF BALANCING WORK LOAD WITH PRIORITIZED TASKS ACROSS A MULTITUDE OF COMMUNICATION PORTS

(75) Inventors: Angqin Bai, Tucson, AZ (US); Alex Chen, Tucson, AZ (US); James Chien-Chiung Chen, Tucson, AZ (US); Minh-Ngoc Le Huynh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 10/794,377

(22) Filed: Mar. 5, 2004

(65) Prior Publication Data

US 2005/0210321 A1 Sep. 22, 2005

(51) Int. Cl.
*G06F 13/14* (2006.01)
(52) U.S. Cl. ............ 710/244; 710/41; 710/44; 710/111; 709/223; 718/105
(58) Field of Classification Search ........ 710/116; 709/224, 250; 718/105; 700/26
See application file for complete search history.

(56) References Cited

U.S. PATENT DOCUMENTS

| | | | | |
|---|---|---|---|---|
| 3,702,006 | A * | 10/1972 | Josiah ............... | 718/105 |
| 5,191,652 | A | 3/1993 | Dias et al. | |
| 5,724,587 | A | 3/1998 | Carmon et al. | |
| 5,748,629 | A | 5/1998 | Caldara et al. | |
| 5,815,492 | A | 9/1998 | Berthaud et al. | |
| 5,881,050 | A | 3/1999 | Chevalier et al. | |
| 6,195,680 | B1 | 2/2001 | Goldszmidt et al. | |
| 6,262,974 | B1 | 7/2001 | Chevalier et al. | |
| 6,263,368 | B1 * | 7/2001 | Martin ............... | 709/224 |
| 6,459,701 | B1 | 10/2002 | Henson et al. | |
| 6,611,723 | B1 * | 8/2003 | Kehrer et al. ....... | 700/26 |
| 2002/0140851 | A1 | 10/2002 | Laksono | |
| 2003/0091037 | A1 | 5/2003 | Latif et al. | |
| 2003/0126314 | A1 | 7/2003 | Litt | |
| 2005/0125563 | A1 * | 6/2005 | Douglas ............ | 709/250 |

FOREIGN PATENT DOCUMENTS

EP 0192056 B1 1/1986

OTHER PUBLICATIONS

IBM Technical Disclosure Bulletin, "Method for Managing High Priority Tasks on Multiport Communications Adapter Card," vol. 30, No. 9, Feb. 1988.
A. Couder et al., "Dynamic Priority Manager Under Application Program Control," IBM Technical Disclosure Bulletin, vol. 27, No. 4A, Sep. 1984.
M. A. Hughes et al., "Control Program for Providing Priority Tasking," IBM Technical Disclosure Bulletin, vol. 22, No. 11, Apr. 1980.

* cited by examiner

*Primary Examiner*—Christopher E. Lee
(74) *Attorney, Agent, or Firm*—Quarles & Brady LLP

(57) ABSTRACT

A processor is used to evaluate information regarding the number, size, and priority level of data transfer requests sent to a plurality of communication ports. Additional information regarding the number, size, and priority level of data requests received by the communication ports from this and other processors is evaluated as well. This information is applied to a control algorithm that, in turn, determines which of the communication ports will receive subsequent data transfer requests. The behavior of the control algorithm varies based on the current utilization rate of communication port bandwidths, the size of data transfer requests, and the priority level of the these transfer requests.

19 Claims, 5 Drawing Sheets

Primary Port Control Algorithm

METHOD OF BALANCING WORK LOAD WITH PRIORITIZED TASKS ACROSS A MULTITUDE OF COMMUNICATION PORTS

BACKGROUND OF THE INVENTION

1. Field of the Invention

This invention is related in general to the field of computer systems. In particular, the invention consists of a copying technique where data at a primary storage system is backed-up to a secondary storage system.

2. Description of the Prior Art

Computer storage systems such as storage servers commonly employ backup techniques utilizing a primary storage system and a secondary storage system to maintain a redundant copy of stored data. The secondary storage system is typically located at a location that is remote from the primary storage system and receives data from the primary via a high-speed data link such as an optical-fiber connection. In other cases, the secondary and primary storage systems may physically reside within the same storage server and data is backed up locally. Tracks are arbitrary units of storage such as a partition, a hard-drive, a tape, or an array of disk-drives that can be formatted to contain a set of sequentially addressed data records. Data transfers between storage systems often take the form of either single-track transfers or multi-track transfers.

One form of remote redundant storage is peer-to-peer remote copying ("PPRC") over fiber-optic cable ("fibre") using multiple communications channels. Each communication channel is formed using a port from the primary storage server routed to a port of the secondary storage server through a bridge, bus, or network switch. Each port is analogous to a network interface card in a local-area network system ("LAN"). The primary and secondary storage servers may have a multitude of ports and the actual communication paths are determined by the routing devices.

Performance of a PPRC system is maximized when the primary ports are driven to saturation, i.e., 100% utilization of port bandwidth. Requests to send information from the primary to the secondary storage server are usually assigned a priority level. During periods of high bandwidth demand, low-priority requests should are sometimes throttled to ensure efficient execution of high-priority requests. A device implementing a port-request control algorithm is required to efficiently manage these communication channels. It is desirable that this control algorithm be responsive to all data-transfer requests, ensure execution of high-priority tasks, and optimize the bandwidth utilization of the communication channels.

In U.S. Pat. No. 5,881,050, Denis Chevalier et. al. disclose a method and system for non-disruptively assigning link bandwidth to a user in a high-speed digital network. Link bandwidth is assigned to requesting users based on predefined connection priorities. A predefined reservable link bandwidth is divided into nominal bandwidth portions and common bandwidth portions, both of which are assignable on a priority basis.

An important aspect of Chevalier's invention is that common bandwidth is associated with and subservient to nominal bandwidth, thus preventing disruption of established network connections. However, Chevalier does not address balancing the priority of the work load over the communication channels. Accordingly, it would be advantageous to utilize a control algorithm to simultaneously balance the work load and task prioritization across the data paths while maintaining a relatively uniform bandwidth utilization.

SUMMARY OF THE INVENTION

The invention disclosed herein is a system implementing a control algorithm to manage copy requests from a primary storage server to a secondary storage server. A processor sends copy requests to an array of primary ports based on: (1) balancing the communication bandwidth utilization of the primary ports, (2) balancing the priority of messages sent to the primary ports, and (3) balancing the size of messages assigned to the primary ports.

A processor input/output ("I/O") meter tracks the number, size, and priority of copy requests sent to each primary port. Another I/O meter located at each primary port tracks the current status of the port including the size, priority, and status of its current job as well as data transfer tasks that have been queued. Job requests that have been transmitted by the processor to the primary ports may be in transit and therefore may not be reflected by the port I/O meter. Once a copy request has been completed, the primary port transmits an acknowledgment as well as port I/O meter information to the processor. The processor I/O meter is updated and the control algorithm's behavior accommodates the current state of the port.

One reason for utilizing multi-level I/O meters is that more than one processor may send requests to the same array of primary ports. While each processor is aware of the tasks it has assigned to the primary ports, information provided by the port I/O meters is required to ensure that the control algorithm takes into account tasks assigned by other processors.

One aspect of this invention is that copy requests are evaluated by the processor based on message size and priority. Copy requests are assigned in a manner to maximize high-priority task completion while preventing the starvation of low-priority tasks and to provide a relatively uniform mix of small vs. large messages, while maintaining a substantially uniform communication bandwidth utilization. An advantage of this invention is that the control algorithm can accommodate multiple processors simultaneously driving a multitude of primary ports while maintaining operational objectives.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

Figure 1:
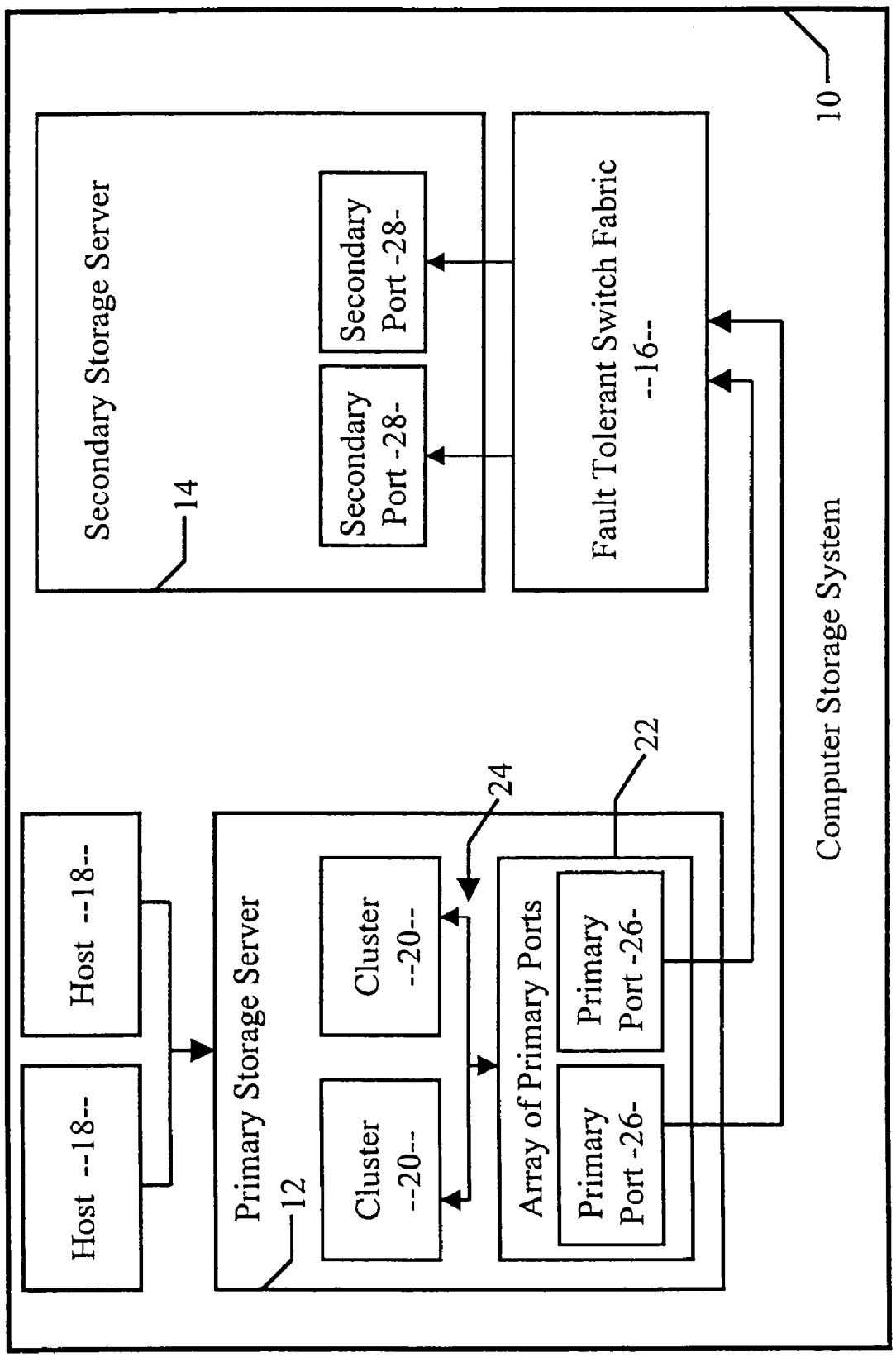
FIG. 1 is a schematic diagram of a computer storage system in accordance with the invention, wherein a primary storage server transmits data to a secondary storage server.

This invention is based on the idea of using a primary storage server implementing a control algorithm to efficiently transmit data to a secondary storage server. Referring to the figures, wherein like parts are designated with the same reference numerals and symbols, FIG. 1 is a schematic illustration of a computer storage system 10, including a primary storage server 12, a secondary storage system 14, and a multitude of communication channels 16. In this embodiment of the invention, the multitude of communication channels 16 is a fault-tolerant switch fabric. However, the multitude of communication channels may be a multi-port bus, a local-area network, a wide-area network, a point-to-point network, a bridge, a router, or other similar device.

The computer storage system 10 is designed to accept read/write requests from a host 18. Data is maintained within the primary storage server 12 and a redundant copy is kept within the secondary storage server 14. The primary storage server may be comprised of two or more symmetrical multi-processors ("SMPs") indicated herein as clusters 20. Requests from the host 18 may be run by any of the clusters 20 within the primary storage server 12.

In order to maintain coherence of data between the primary storage server 12 and the secondary storage server, data is routinely transmitted through an array of primary ports 22. This array of primary ports 22 communicates with the clusters 20 through a local multi-path communication device 24 such as a bus, router, switch, bridge, or other similar communication device. Information arriving at the array of primary ports 22 is transmitted through the multitude of communication channels 16. Data is received by the secondary ports 28 coupled to the secondary storage system 14.

One consideration of transmitting data through the primary ports 26 is the communication bandwidth of the ports. If the primary ports 26 are similar devices with similar access to communication channels 16, then they are considered to have equivalent communication bandwidths. If the bandwidths of the primary ports 26 are dissimilar, then this dissimilarity must be allowed for in any algorithm designed to assign communication tasks to the primary ports 26.

Data transmitted from the primary storage server 12 to the secondary storage server 14 is often assigned a priority level. High-priority messages are allocated more computer storage system resources than low-priority messages. The resource that is the focus of this disclosure is access to the primary ports 26 and, by extension, the multitude of communication channels 16. If the primary storage server 12 generates more copy requests than can be handled by the primary ports 26 without interruption, the resources of the primary ports become saturated and tasks must be queued at either the cluster 20 or the array of primary ports 22.

Another consideration for assigning a copy request to a primary port 26 is the size of the message being transmitted. If several large transfer requests are sent to one primary port 26 and several small transfer requests are sent to another primary port 26, then the bandwidth utilization between these ports has become unbalanced even though they have been assigned the same number of tasks.

Figure 2:
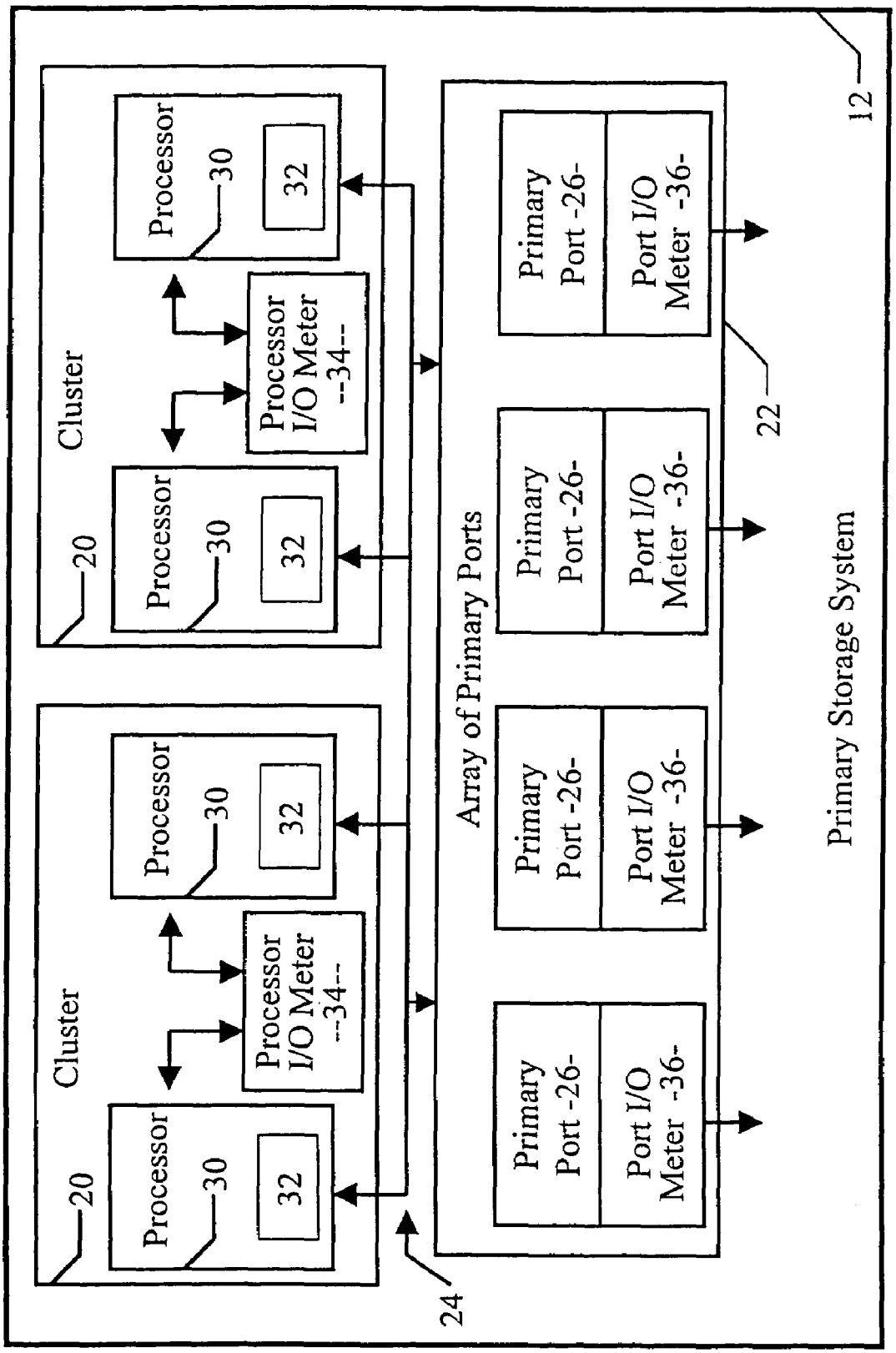
FIG. 2 is a schematic diagram of the primary storage server presented in FIG. 1, illustrating the utilization of processor input/output meters and port input/output meters in accordance with the invention.

FIG. 2 is a schematic illustration of the primary storage system 12 adapted to implement a primary-port control-algorithm 32. The clusters 20 are comprised of one or more processors 30. The processors 30 receive read/write requests from the hosts 18, evaluate utilization parameters (number, size, and priority of outstanding data transfer requests) of the primary ports 26, implement primary-port control-algorithms 32 and transmit copy requests to the primary ports 26.

In this embodiment of the invention, the processors 30 are general-purpose computer processing units ("CPUs"). However, the processors may be implemented as micro-processors, application-specific integrated circuits ("ASICs"), complex programmable logic devices ("CPLDs"), field-programmable gate arrays ("FPGAs"), or other computational devices. The processors may be programmed with an algorithmic structure, as in the case of FPGAs, or the algorithm may reside in memory either within the processor or coupled to the processor. Accordingly the primary-port control-algorithm 32 may be either a hardware construct or a software construct.

One aspect of this invention is the utilization of processor input/output ("I/O") meters 34 to track the number of copy requests sent to each primary port 26, the size of each transmitted copy request, and the priority level of each message. The processors 30 apply this information to the control algorithm 32 to determine which subsequent copy requests are sent to which primary ports 26.

If a copy request arrives at a primary port 26 while the resources of the port are saturated, the new copy request is placed in a queue until the port becomes available. Because primary ports 26 may receive copy requests from more than one cluster 20, the number, size, and priority of data transfers which are queued for each primary port 26 may differ from the information maintained by the processor I/O meter 34. Primary port 26 job and queue information is maintained by port I/O meters 36.

Figure 3:
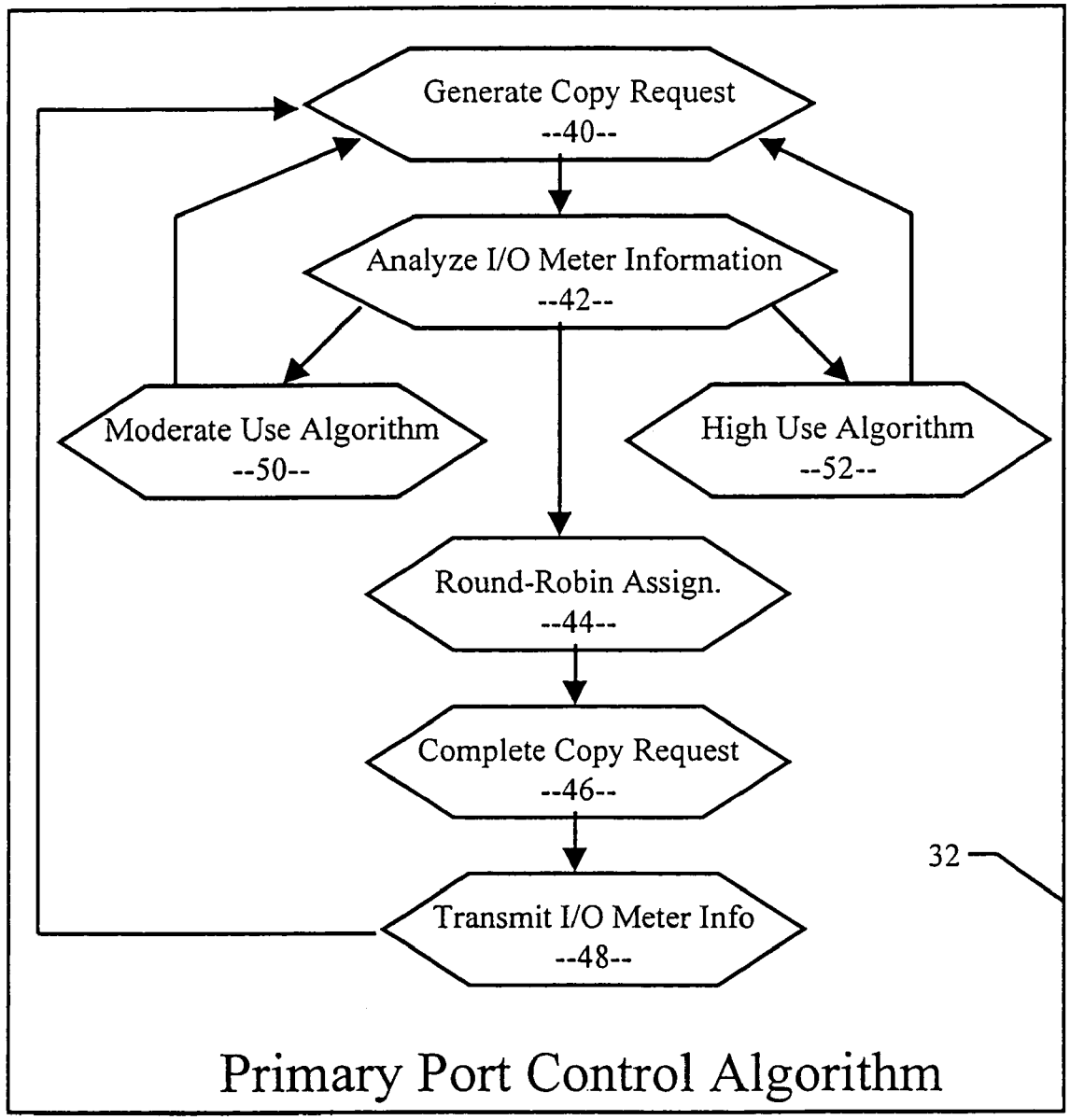
FIG. 3 is a flow-chart illustrating a primary-port control-algorithm in accordance with the invention.

FIG. 3 is a flow-chart illustrating the primary-port control-algorithm 32. If a processor 30 wishes to generate a copy request 40, processor I/O meter 34 information and port I/O meter 36 information are evaluated 42 to determine if any primary ports 26 have a bandwidth utilization rate of less than a certain percentage, i.e., a low-utilization rate threshold. For exemplary purposes, a low-utilization rate threshold of 50% is used in this embodiment. If all the ports 26 have a bandwidth utilization rate greater than the low-utilization rate threshold, the algorithm proceeds to the moderate-utilization sub-algorithm 50, unless all ports 26 are saturated (have a bandwidth utilization rate greater than 100%), in which case the algorithm proceeds to the high-utilization sub-algorithm 52.

If any primary ports 26 are below the low-utilization rate threshold, the processor 30 assigns 44 the copy request to one of these ports using a round-robin algorithm, i.e., the low-utilization primary ports are identified and given a sequential ordering. Copy request tasks are then assigned sequentially to these ports. No consideration is given to the size or priority level of the copy request, nor is any consideration given to the bandwidth utilization rates among the primary ports 26 which are below the low-utilization rate threshold. Once a primary port 26 has completed 46 a copy request, status information associated with the port is transmitted 48 by the port I/O meter 36 to the processor 30.

Figure 4:
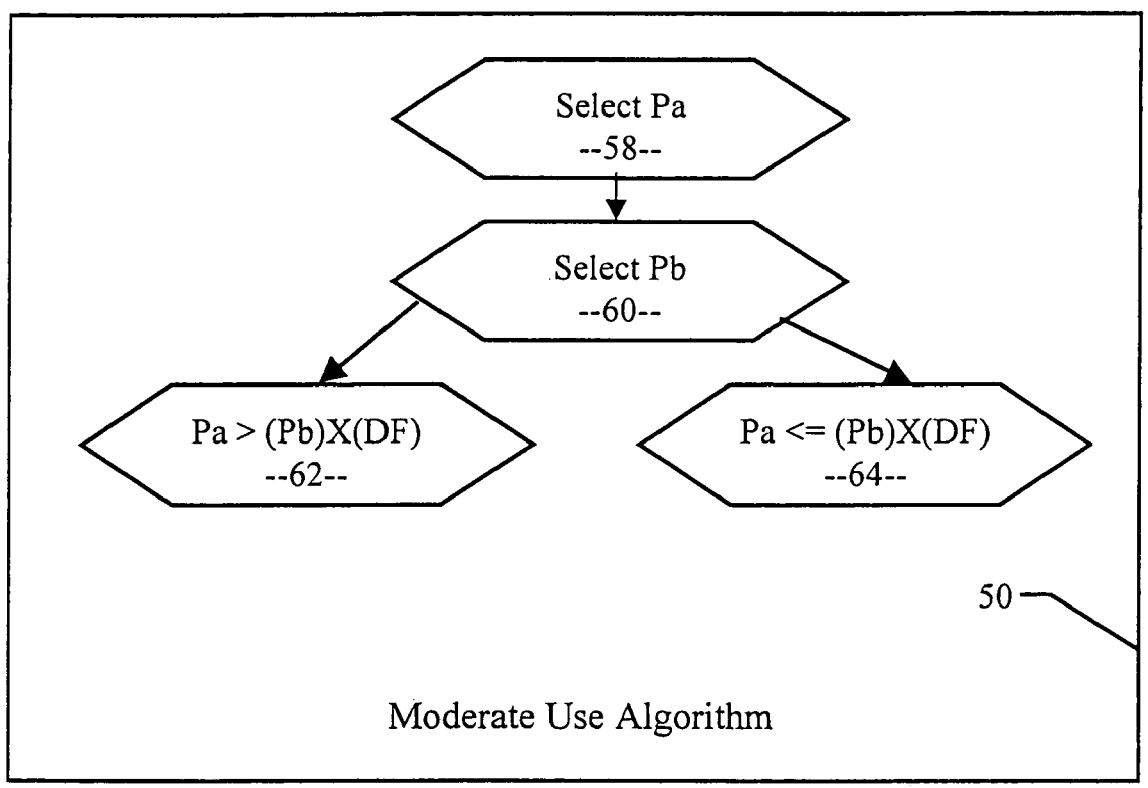
FIG. 4 is a flow-chart illustrating a moderate utilization-rate sub-algorithm.

The moderate-utilization sub-algorithm 50 is illustrated in the flow chart of FIG. 4. Processor I/O meter 34 information and port I/O meter 36 information are evaluated to identify 58 the primary port Pa that has the least bandwidth utilization. If the current copy request is to transfer a large data message, the port with the highest number of I/O requests is identified 60 as Pb. If, however, the current copy request is for a small data message, the port with the lowest number of I/O requests is identified 60 as Pb. The size at which a data message is considered large or small is determined by the user. In general, small data transfers require more processor time and large data transfers require more communication bandwidth. Accordingly, defining a the boundary between large and small data messages is a function of the computer storage system 10 resources including the processors 30, ports 26, and communication channels 16,24.

Balancing small and large data transfer requests is desirable to achieve an efficient data transfer rate. However, balancing data transfers based on the size of the data messages is only meaningful if the bandwidth utilization of the ports 26 is relatively uniform. To evaluate whether ports 26 have a relatively similar bandwidth utilization rate, a differential factor ("DF") is employed. For exemplary purposes, a DF of 10% is used in this embodiment of the invention. Ports Pa and Pb are evaluated to determine if their bandwidth utilization differs by an amount less than the DF.

If the bandwidth utilization between Pa and Pb is greater than the DF, then the copy request is sent 62 to port Pa. Otherwise, port Pb is selected 64 to transmit the data message. In this sub-algorithm, no consideration is given to the priority level of the copy request.

Figure 5:
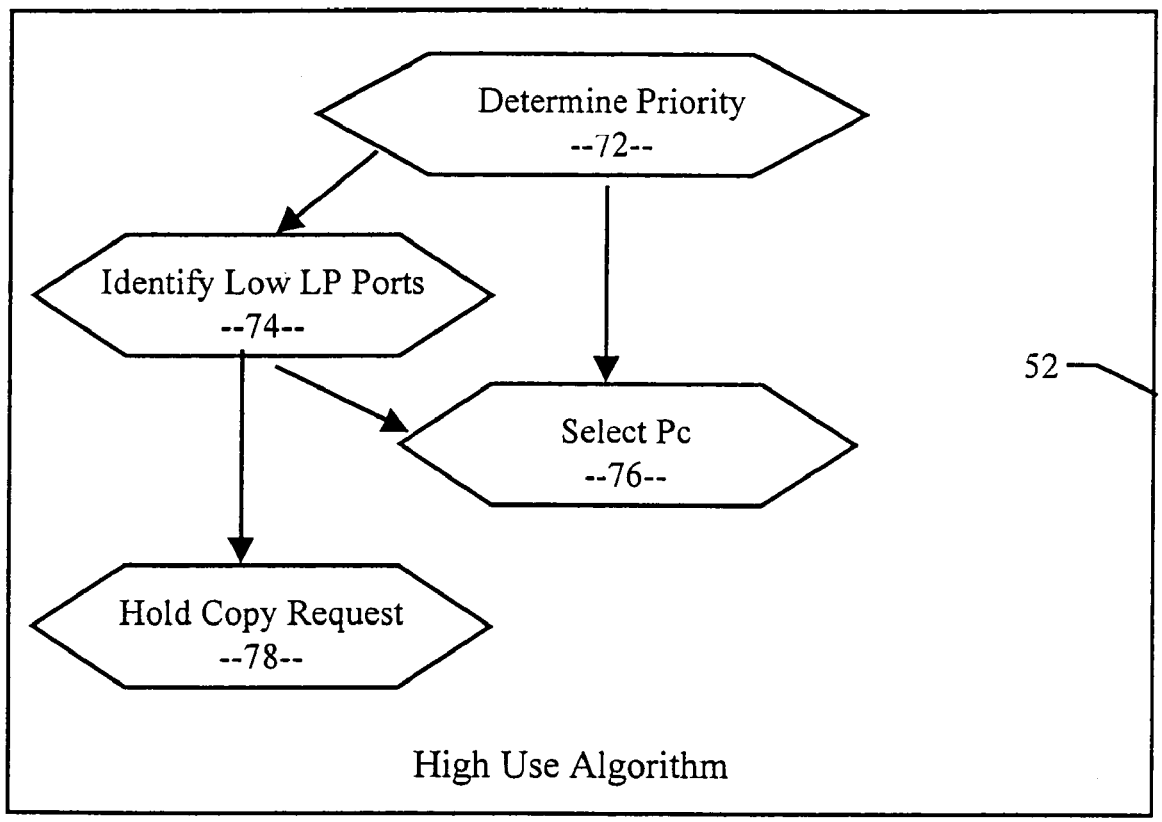
FIG. 5 is a flow-chart illustrating a high utilization-rate sub-algorithm.

FIG. 5 illustrates he high bandwidth-utilization algorithm 52. A priority level associated with the copy request is first determined in step 72. If the priority level is low, processor I/O meter 34 information and port I/O meter 36 information are evaluated to identify 74 any primary ports 26 that have outstanding transfer requests wherein low-priority job requests make-up less than a certain percentage of communication bandwidth, i.e., a low-priority threshold. For exemplary purpose, a low-priority threshold of 20% is used in this embodiment of the invention. The message is sent 76 to the port 26 below the low-priority threshold having the least amount of bandwidth utilization Pc. If no ports 26 are identified as being below the low-priority threshold, the current low-priority job is queued by the processor for later distribution in step 78. If the priority level of the transfer request is high, then the message is simply sent 76 to the port with the least amount of bandwidth utilization.

Those skilled in the art of making computer storage systems may develop other embodiments of the present invention. For example, each processor may include its own processor I/O meter or a combined I/O meter may be used to store both processor information and port information.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A computer communication system, comprising:
  a primary storage server including a first processor adapted to include a first primary-port control-algorithm;
  a processor input/output meter;
  a plurality of primary ports; and
  a primary-port input/output meter;
  wherein the processor input/output meter is adapted to provide to the first processor a first set of information including:
    a first number representative of a first plurality of data transfer requests transmitted to the plurality of primary ports by the first processor,
    a first size of each of said first plurality of data transfer requests, and
    a first priority level of each of said first plurality of data transfer requests;
  wherein the primary-port input/output meter is adapted to provide to the first processor an additional set of information for each of said plurality of primary ports, said additional set of information including:
    an additional number representative of an additional plurality of data transfer requests received by the primary port,
    an additional size of each of said additional plurality of data transfer requests, and
    an additional priority level of each of said additional plurality of data transfer requests; and
  wherein the first primary-port control algorithm is adapted to direct the first processor to transmit said first plurality of data transfer requests to said plurality of primary ports, a first behavior of said first primary-port control algorithm being dependent upon said first number, first size, and first priority level, and upon said additional number, additional size, and additional priority level.

2. The computer communication system of claim 1, wherein said primary storage server includes a second processor adapted to include a second primary-port control-algorithm; and
  wherein said processor input/output meter is adapted to provide to the second processor a second set of information including:
    a second number representative of a second plurality of data transfer requests transmitted to the plurality of primary ports by the second processor,
    a second size of each of said second plurality of data transfer requests, and
    a second priority level of each of said second plurality of data transfer requests.

3. The computer communication system of claim 1, wherein said first primary-port control-algorithm is programmed to:
  analyze said first number, first size, first priority level, additional number, additional size and additional priority level;
  subsequently determine a bandwidth utilization rate of each of said plurality of primary ports;
  subsequently invoke a low utilization rate sub-algorithm if any of said plurality of primary ports is operating below a low-utilization rate threshold;
  subsequently invoke a moderate-utilization rate sub-algorithm if all of said plurality of primary ports is operating at or above the low-utilization threshold but at least one of said plurality of primary ports is operating below a saturation level;
  subsequently invoke a high-utilization rate sub-algorithm if all of said plurality of primary ports is operating at or above the saturation level.

4. The computer communication system of claim 3, wherein said low-utilization rate sub-algorithm is programmed to:
  direct said first processor to transmit said first plurality of data transfer requests to said plurality of primary ports that have been identified as operating below the low-utilization rate threshold, using a round-robin schema.

5. The computer communication system of claim 3, wherein said moderate-utilization rate sub-algorithm is programmed to:
identify a first primary port from the plurality of primary ports with a lowest bandwidth utilization rate;
determine whether a new data transfer request from the first plurality of data transfer requests is a large data transfer or a small data transfer, and
if said new data transfer request is a large data transfer, subsequently identify a second primary port from the plurality of primary ports with a highest number of outstanding data transfer requests, and
if said new data transfer request is a small data transfer, subsequently identify a second primary port from the plurality of primary ports with a lowest number of outstanding data transfer requests;
subsequently direct said first processor to transmit said new data transfer request to said first primary port if a difference between the bandwidth utilization rate of said first primary port and the bandwidth utilization rate of said second primary port is greater than a pre-determined differential factor; and
subsequently direct said first processor to transmit said new data transfer request to said second primary port if the difference between the bandwidth utilization rate of said first primary port and the bandwidth utilization rate of said second primary port is less than or equal to the pre-determined differential factor.

6. The computer communication system of claim 3, wherein said high-utilization rate sub-algorithm is programmed to:
determine a priority level associated with a new data transfer request from the first plurality of data transfer requests, and
if said priority level is low, then subsequently identify each of said plurality of primary ports having a cumulative size of outstanding low-priority data transfer requests below a low-priority threshold, and subsequently direct said first processor to transmit said new data transfer request to a primary port identified as having a cumulative size of outstanding low-priority data transfer requests below said low-priority threshold and having a lowest bandwidth utilization rate among said identified primary ports having a cumulative size of outstanding low-priority data transfer requests below the low-priority threshold;
if none of the plurality of primary ports has a cumulative size of outstanding low-priority data transfer requests below the low priority threshold, then subsequently direct the first processor to place said new data transfer request in a processor queue; and
if said priority level is high, then subsequently direct said first processor to transmit said new data transfer request to a primary port having a lowest bandwidth utilization rate among said plurality of primary ports.

7. The computer communication system of claim 1, wherein said transmitted first plurality of data transfer requests is transmitted by said plurality of primary ports over a plurality of communication channels.

8. The computer communication system of claim 7, wherein said primary-port input/output meter provides said additional set of information to said first processor after any of said plurality of primary ports has completed a transmission of any of said first plurality of data transfer requests.

9. A computer storage system, comprising:
a primary storage server including a first processor adapted to include a first primary-port control-algorithm;
a processor input/output meter;
a plurality of primary ports; and
a primary-port input/output meter;
wherein the processor input/output meter is adapted to provide to the first processor a first set of information including:
a first number representative of a first plurality of data copy requests transmitted to the plurality of primary ports by the first processor,
a first size of each of said first plurality of data copy requests, and
a first priority level of each of said first plurality of data copy requests;
wherein the primary-port input/output meter is adapted to provide to the first processor an additional set of information for each of said plurality of primary ports, said additional set of information including:
an additional number representative of an additional plurality of data copy requests received by the primary port,
an additional size of each of said additional plurality of data copy requests, and
an additional priority level of each of said additional plurality of data copy requests; and
wherein the first primary-port control-algorithm is adapted to direct the first processor to transmit said first plurality of data copy requests to said plurality of primary ports, a behavior of said first primary-port control algorithm being dependent upon said first number, first size, and first priority level, and upon said additional number, additional size, and additional priority level.

10. The computer communication system of claim 9, wherein said primary storage server includes a second processor adapted to include a second primary-port control-algorithm; and
wherein said processor input/output meter is adapted to provide to the second processor a second set of information including:
a second number representative of a second plurality of data copy requests transmitted to the plurality of primary ports by the second processor,
a second size of each of said second plurality of data copy requests, and
a second priority level of each of said second plurality of data copy requests;
wherein the primary-port input/output meter is adapted to provide to the second processor an additional set of information for each of said plurality of primary ports, said additional set of information including:
an additional number representative of an additional plurality of data copy requests received by the primary port,
an additional size of each of said additional plurality of data copy requests, and
an additional priority level of each of said additional plurality of data copy requests; and
wherein the second primary-port control-algorithm is adapted to direct the second processor to transmit said second plurality of data copy requests to said plurality of primary ports, a second behavior of said second primary-port control algorithm being dependent upon said second number, second size, and second priority level, and upon said additional number, additional size, and additional priority level.

11. The computer communication system of claim 10, wherein said first primary-port control-algorithm is programmed to:
analyze said first number, first size, first priority level, additional number, additional size and additional priority level;
subsequently determine the bandwidth utilization rate of each of said plurality of primary ports; subsequently invoke a low-utilization rate sub-algorithm if any of said plurality of primary ports is operating below a low-utilization rate threshold;
subsequently invoke a moderate-utilization rate sub-algorithm if all of said plurality of primary ports is operating at or above the low-utilization threshold but at least one of said plurality of primary ports is operating below a saturation level;
subsequently invoke a high-utilization rate sub-algorithm if all of said plurality of primary ports is operating at or above the saturation level.

12. A method of transmitting information, comprising:
receiving a first set of status information from a processor input/output meter, said first set of status information to include a first number representative of a first plurality of data transfer requests transmitted by a first processor to a plurality of primary ports, a first size of each of said first plurality of data transfer requests, and a first priority level of each of said first plurality of data transfer requests;
receiving an additional set of status information from a primary port input/output meter, said additional set of status information to include an additional number representative of an additional plurality of data transfer requests received by each of said plurality of primary ports, an additional size of each of said additional plurality of data transfer requests, and an additional priority level of each of said additional plurality of data transfer requests;
directing the first processor to transmit said first plurality of data transfer requests to said plurality of primary ports, said directing the first processor to transmit being dependent upon said first number, first size, and first priority level, and upon said additional number, additional size, and additional priority level.

13. The method of claim 12, further comprising:
receiving a second set of status information from a processor input/output meter, said second set of status information to include a second number representative of a second plurality of data transfer requests transmitted by a second processor to the plurality of primary ports, a second size of each of said second plurality of data transfer requests, and a second priority level of each of said second plurality of data transfer requests; and
directing the second processor to transmit said second plurality of data transfer requests to said plurality of primary ports, said directing the second processor to transmit being dependent upon said second number, second size, and second priority level, and upon said additional number, additional size, and additional priority level.

14. The method of claim 12, wherein said directing said first processor to transmit said first plurality of data transfer requests further comprises:

analyzing said first number, first size, first priority level, additional number, additional size and additional priority level;
subsequently determining a bandwidth utilization rate of each of said plurality of primary ports;
subsequently invoking a low-utilization rate sub-algorithm if any of said plurality of primary ports is operating below a low-utilization rate threshold;
subsequently invoking a moderate-utilization rate sub-algorithm if all of said plurality of primary ports is operating at or above the low-utilization threshold but at least one of said plurality of primary ports is operating below a saturation level;
subsequently invoking a high-utilization rate sub-algorithm if all of said plurality of primary ports is operating at or above the saturation level.

15. The method of claim 14, wherein said low-utilization rate sub-algorithm is programmed to:
direct said first processor to transmit said first plurality of data transfer requests to said plurality of primary ports that have been identified as operating below the low-utilization rate threshold, using a round-robin schema.

16. The method of claim 14, wherein said moderate-utilization rate sub-algorithm is programmed to:
identify a first primary port from the plurality of primary ports with a lowest bandwidth utilization rate;
determine whether a new data transfer request from the first plurality of data transfer requests is a large data transfer or a small data transfer, and
if said new data transfer request is a large data transfer, subsequently identify a second primary port from the plurality of primary ports with a highest number of outstanding data transfer requests, and
if said new data transfer request is a small data transfer, subsequently identify a second primary port from the plurality of primary ports with a lowest number of outstanding data transfer requests;
subsequently direct said first processor to transmit said new data transfer request to said first primary port if said first primary port is the same as said second primary port;
subsequently direct said first processor to transmit said new data transfer request to said first primary port if a difference between the bandwidth utilization rate of said first primary port and the bandwidth utilization rate of said second primary port is greater than a pre-determined differential factor; and
subsequently direct said first processor to transmit said new data transfer request to said second primary port if the difference between the bandwidth utilization rate of said first primary port and the bandwidth utilization rate of said second primary port is less than or equal to the pre-determined differential factor.

17. The method of claim 14, wherein said high-utilization rate sub-algorithm is programmed to:
determine a priority level associated with a new data transfer request from the first plurality of data transfer requests, and
if said priority level is low, then subsequently identify each of said plurality of primary ports having a cumulative size of outstanding low-priority data transfer requests below a low-priority threshold, and
subsequently direct said first processor to transmit said new data transfer request to a primary port identified as having a cumulative size of outstand ing low-priority data transfer requests below said low-priority threshold and having a lowest bandwidth utilization rate among said identified primary ports having a cumulative size of outstanding low-priority data transfer requests below the low-priority threshold;

if none of the plurality of primary ports has a cumulative size of outstanding low-priority data transfer requests below the low-priority threshold, then subsequently direct the first processor to place said new data transfer request in a processor queue; and if said priority level is high, then subsequently direct said first processor to transmit said new data transfer request to a primary port having a lowest bandwidth utilization rate among said plurality of primary ports.

18. The method of claim 12, wherein said transmitted first plurality of data transfer requests is transmitted by said plurality of primary ports over a plurality of communication channels.

19. The method of claim 18, wherein said primary-port input/output meter provides said additional set of information to said first processor after any of said plurality of primary ports has completed a transmission of any of said first plurality of data transfer requests.

* * * * *